United States Patent [19]

Browning

[11] Patent Number: 5,308,099
[45] Date of Patent: May 3, 1994

[54] BICYCLE SUSPENSION SYSTEM

[76] Inventor: Michael R. S. Browning, 7 Belgrave Ct., Blackwater, Camberley GU17 9JE, England

[21] Appl. No.: 588,160

[22] Filed: Sep. 26, 1990

[30] Foreign Application Priority Data

Sep. 26, 1989 [GB] United Kingdom ............... 8921962

[51] Int. Cl.⁵ ............................................. B62K 25/08
[52] U.S. Cl. ................................. 280/276; 188/319; 267/64.15; 403/328
[58] Field of Search ............. 280/276, 279, 283, 277; 188/319; 403/96, 328; 267/64.15, 64.23

[56] References Cited

U.S. PATENT DOCUMENTS

| | | | |
|---|---|---|---|
| 1,205,433 | 11/1916 | Christman | 188/319 |
| 3,083,038 | 3/1963 | Moulton | 280/276 |
| 4,026,605 | 5/1977 | Emmerich | 403/328 |
| 4,313,529 | 2/1982 | Kato et al. | 188/319 |
| 4,881,750 | 11/1989 | Hartmann | 280/276 |
| 4,960,344 | 10/1990 | Geisthoff et al. | 403/328 |
| 5,097,928 | 3/1992 | Enders et al. | 267/64.15 |

FOREIGN PATENT DOCUMENTS

| | | | |
|---|---|---|---|
| 0063635 | 4/1981 | European Pat. Off. | 267/64.15 |
| 2805578 | 8/1979 | Fed. Rep. of Germany | 280/276 |
| 365568 | 12/1938 | Italy | 280/276 |
| 433156 | 4/1948 | Italy | 280/276 |
| 571871 | 1/1958 | Italy | 188/319 |

Primary Examiner—Margaret A. Focarino
Assistant Examiner—Anne Marie Boehler
Attorney, Agent, or Firm—Chilton, Alix & Van Kirk

[57] ABSTRACT

A bicycle suspension system is provided that may be located in the head tube at the front of the bicycle frame. The system may be hydraulic, hydro-pneumatic or spring based, but in each case the degree of damping provided may be adjusted by a rotatable knob at the top of the head tube that is easily operable by a rider.

8 Claims, 3 Drawing Sheets

BICYCLE SUSPENSION SYSTEM

This invention relates to a suspension system for a pedal bicycle.

Traditionally bicycles have been designed without a dedicated suspension system. Instead suspension has been provided only by the provision of pneumatic tires, and with a degree of shock absorbency being provided by the design of the frame. Increasingly this approach has been regarded as being inadequate. Riders have begun to seek more comfortable bicycles for conventional cycling, and off-road rough terrain cycling has become increasingly popular.

Accordingly a number of attempts have been made to provide a bicycle with a suspension system for the front and/or rear wheels. Previous designs have, however, met with a number of problems and thus have had only limited success to date. Known systems have, for example, been heavy or cumbersome to fit into a conventional bicycle design. Moreover, in conventional bicycle suspension systems the degree of damping that is provided has either been fixed, which substantially limits the versatility of the system, or else can only be adjusted with difficulty, for example in a garage or workshop.

Viewed from one broad aspect the present invention provides a suspension system for a pedal bicycle comprising, damping means adapted to be located within a part of the frame of a bicycle, and adjusting means for varying the degree of damping provided by said damping means, said adjusting means being operable by a rider while cycling.

In accordance with the invention a less cumbersome suspension of greater versatility may be provided as compared with known systems.

Preferably the suspension system is adapted to be associated with the front wheel of the bicycle. In such an arrangement the damping means may be located within the steering tube, which in turn is located within the head tube, and the adjusting means may be operable from the vicinity of the handle-bars.

The damping means may take one of various forms. It may for example be hydraulic, or alternatively may be a coulomb-type dry damping system.

The nature of the damping adjusting means will of course depend on the type of damping means chosen. Preferably, however, adjustment is effected by rotation of a member and adjustment may be made by a rider turning a knob provided at the top of the head tube. Such a knob may be turned directly by a rider, or indirectly by means of a cable extending from a lever arrangement provided near a rider's hands.

In hydraulic systems the damping means comprises a chamber containing hydraulic fluid and divided into two communicating portions by a piston. Upon movement of the wheel relative to the bicycle frame, relative movement of the piston in the chamber occurs, the degree of damping experienced by the rider being controlled by the rate at which fluid can pass from one side of the piston to the other through a communicating passage. This ratio may be varied in a number of ways. For example, the communicating passage may be defined by a needle valve the degree of opening of which can be adjusted. Alternatively the communicating passage may be defined by a rotatable valve. Such a valve may be constructed, for example, by means of an axial groove formed on the surface of a rotatable rod and extending from above to below the piston and communicating at each end with holes formed in a surrounding extension of the piston. This extension may be formed with a number of pairs of such holes, each pair having different sized holes such that as the rod is rotated the groove is brought into engagement with differently sized holes to vary the degree of damping. In a still further embodiment the variously sized holes may be provided in a hollow rotatable central member, with fixed size openings being provided in the surrounding piston.

In a hydraulic suspension, a volume of pressurized gas may be provided, e.g. disposed between the hydraulic chamber and the wheel, to act as a volume compensating means to prevent a hydraulic lock from occurring. The bottom of the hydraulic chamber may, for example, be a free piston dividing the gas from the hydraulic fluid.

Dry, i.e. non-hydraulic, suspension systems may provide damping in a number of ways but a preferred such method is to use a friction element that is urged into engagement with a member that moves with the wheel. The friction element may be located within a tube and be urged outwardly into engagement with the tube. This may be effected by cam means, or the friction element may be an elastomeric ring that is progressively squashed in an axial direction so that is expands radially. The degree of damping is controlled by the extent to which the friction element or ring engages the tube.

The adjustment of the damping may be continuously variable, at least within a certain range, or may be variable between discrete levels. In the latter case the adjustment means may be provided with a detent mechanism. The adjustment of the damping mechanism also includes the possibility of a 'lock-out' position in which no damping is provided and the suspension is rigid, or at least provides only minimal damping in the event of large shocks. A basic form of the invention may provide only two degrees of damping, e.g. "normal" and "lock-out", although two or more non lock-out degrees are preferred.

It will be appreciated that the suspension system may be provided either as a part of a bicycle when manufactured, or as a separate item that may be retrofitted to existing bicycles.

Viewed from a further broad aspect the present invention provides a bicycle incorporating a suspension system as aforesaid.

Several embodiments of the invention will now be described by ways of example and with reference to the accompanying drawings, in which.

Figure 1:
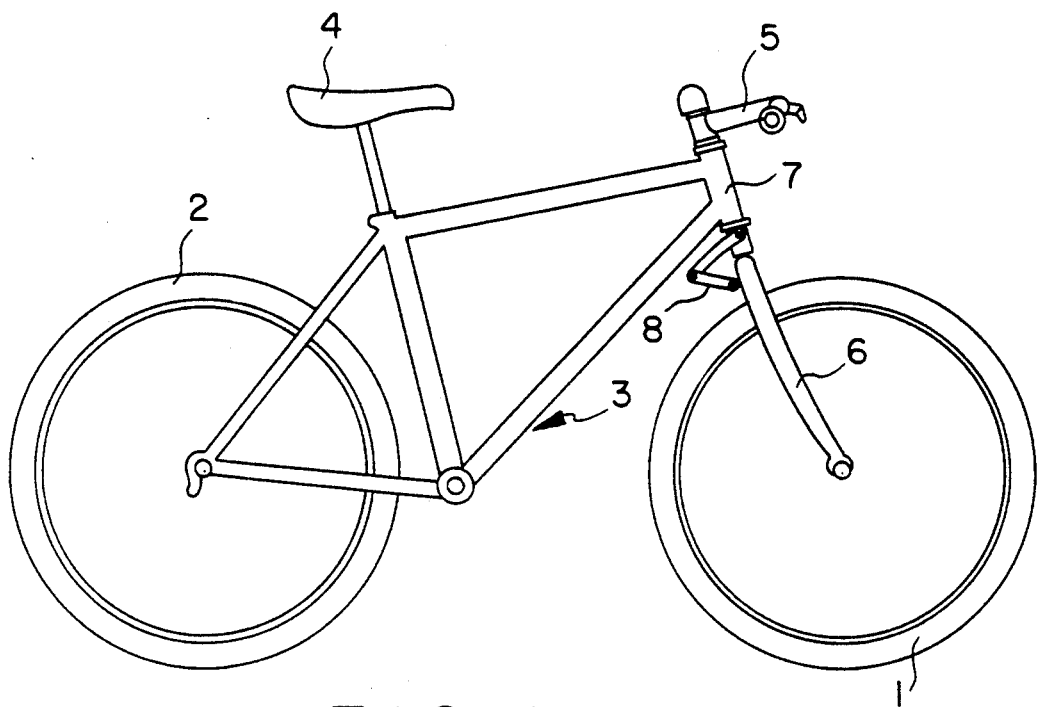
FIG. 1 is a side view of a bicycle incorporating a suspension system according to an embodiment of the invention.

Referring firstly to FIG. 1 there is shown a bicycle having front and rear wheels 1, 2, a frame 3, saddle 4 and handle bars 5. At the front of the frame 3, between the handle-bars 5 and the front fork 6, is a generally vertical tubular member known as the head tube 7. It is within this tube that the suspension system is preferably located. Since the front wheel can be turned to steer the bicycle, a steering linkage 8 is provided as will be discussed further below.

Figure 2:
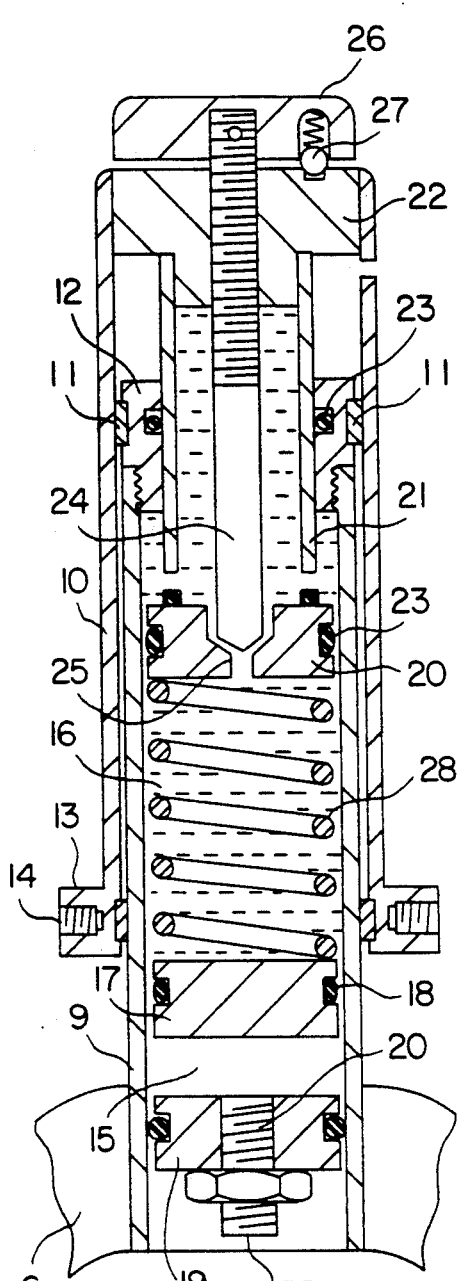
FIG. 2 is a sectional view through a first embodiment.

FIG. 2 illustrates a first embodiment of a suspension system. The suspension system comprises a suspension tube 9 that is fixed at its lower end to front fork 6 so that the suspension tube can move vertically with the wheel. The suspension tube 9 is received within steering tube 10 and can slide therein by virtue of slide bearings 11 provided between the outer surface of an annular block 12 screwed to the top of the suspension tube 9 and the inner surface of steering tube 10. The steering tube 10 is received within the head tube (not shown in FIG. 2) and connects at the top with the handle-bars in any conventional manner. At the bottom the steering tube is provided with projecting lugs 13 having threaded bores 14 for connection to the steering linkage.

The suspension tube is divided into a pneumatic chamber 15 and a hydraulic chamber 16. These two chambers are divided from each other by means of a free piston 17 sealed by an O-ring 18.

The pneumatic chamber 15 is defined by the lower face of piston 17 and the upper face of a plug 19 fitted to the bottom of suspension which includes a screw-threaded valve 52. The pneumatic chamber is charged with a pressurized gas, preferably an inert gas such as nitrogen. The pressure of the gas can be pre-set to take account of the varying loads for which the suspension system is designed.

The hydraulic chamber 16 above piston 17 contains hydraulic fluid and is divided into two portions by a fixed piston 20. Piston 20 is fixed to the lower end of a hollow piston tube 21 the upper end of which is fixed to a block 22 fitted in the top of the steering tube 10. Sliding seals, such as O-rings, 23, permit the suspension tube to move axially relative to the piston 20 and piston tube 21. The two sides of the piston 20 communicate via a needle valve comprising a valve rod 24 and a valve seat 25. The upper end of the valve rod 24 threadedly extends through the block 22 to a rotatable knob 26 such that rotation of the knob 26 causes the valve rod 24 to move relative to the seat 25 to vary the valve opening. The knob 26 is provided with a spring and ball detent mechanism 27 to locate the valve rod at selected desired openings. A spring 28 is provided between free piston 17 and fixed piston 20 to provide additional load carrying capacity. The ratio of pneumatic to spring pressure is selected to optimise overall suspension linearity. The ratio of minimum gas chamber volume to maximum determines the rising rate characteristic of the suspension system.

When the bicycle is ridden over rough terrain, or otherwise experiences a vertically directed shock, the suspension tube 9 moves vertically relative to the steering tube 10 and the fixed piston 20. This relative movement is, however, limited by the rate at which the incompressible hydraulic fluid can flow from one side of the piston 20 to the other. For example, if the suspension tube 9 moves upwardly fluid must flow from below piston 20 to above it. This flow rate, and thus the degree of damping provided by the suspension, is controlled by the opening of the needle valve. If the needle valve is fully open, fluid can flow relatively easily and a large degree of damping for the rider is provided: the suspension is soft. As the needle valve is progressively closed, fluid flow is restricted, the degree of damping experienced by the rider is reduced and the suspension becomes more rigid. If the needle valve is completely closed the suspension becomes substantially ineffective and no damping is experienced by the rider, the bicycle assuming the ride characteristics of a conventional bicycle. It will be appreciated that control of the degree of damping is simply effected by varying the opening of the needle valve by rotating knob 26. Knob 26 is provided at the top of the head tube within easy reach of a rider's hands. As an example, the pitch of the thread of the valve rod 24 may be between 0.5 mm and 1 mm, giving a needle movement into or out of the valve seat 25 of 80% of the screw pitch for a 285° rotation of the knob 26.

Figure 3:
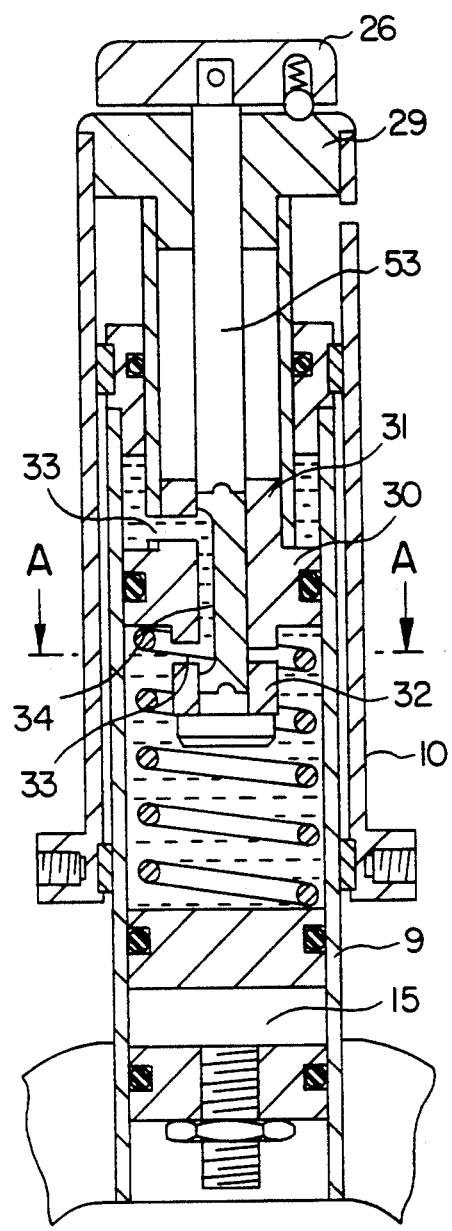
FIG. 3 is a view similar to FIG. 2 of a second embodiment.
Figure 4:
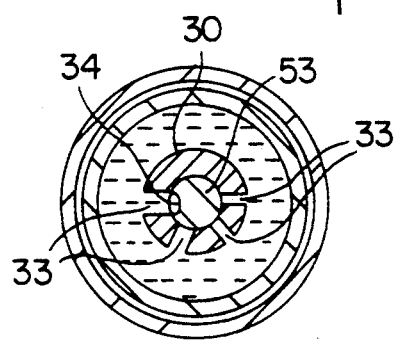
FIG. 4 is a cross-section through line A—A of FIG. 3.

FIGS. 3 and 4 illustrate an embodiment very similar to that of FIG. 2 and thus like parts will not be described again. In the embodiment of FIG. 3, the valve rod 53 is rotatably fitted, but not threadedly, in block 29 and fixed piston 30. Piston 30 is provided with upper and lower extending portions 31, 32 that do not extend radially completely to the walls of the suspension tube. Instead, portions 31, 32 are provided with circumferentially arranged holes 33 of various sizes that form matching pairs in the two portions. The valve rod 53 is provided with an axial groove 34 and communication of fluid between the two sides of the piston is achieved by rotating the valve rod 53 so that the groove 34 connects a pair of said holes 33. The degree of damping depends on the size of the holes connected by the groove. The larger the holes, the more easily fluid can flow and the greater the degree of damping experienced by the rider. The valve rod may also have a position in which no holes are connected by the groove and thus no hydraulic flow is provided.

It will be appreciated that as the suspension tube 9 of the embodiments of FIGS. 2 and 3 moves into steering tube 10, the valve rod 24, 53 effectively extends further into the hydraulic chamber. Since the hydraulic fluid is incompressible this is only possible since the gas chamber 15 can be reduced in volume accordingly to compensate for the change in volume of the hydraulic chamber caused by the valve rod. The pneumatic chamber 15 could however, be provided elsewhere, e.g. within the hydraulic chamber, or could be omitted if an alternative form of volume compensating means were provided.

Figure 5:
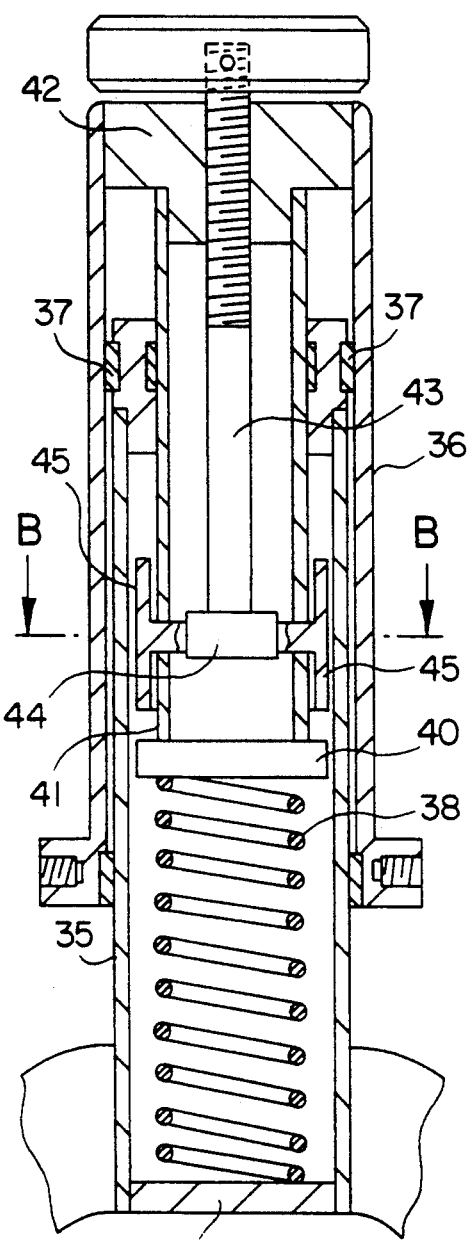
FIG. 5 is a view similar to FIG. 2 of a third embodiment.

Referring to FIG. 5, the suspension tube 35 is received within steering tube 36 and slides axially therein through slide bearings 37. A compression spring 38 is disposed between a stop 39 fixed at the bottom of the suspension tube 35, and a block 40 fitted at the lower end of a hollow tubular member 41 that extends down from a block 42 fitted to the top of the steering tube 36. As the suspension tube moves upwardly relative to the steering tube the spring is compressed. Variation in the degree of damping is obtained by restricting the ability of the suspension tube to move relative to the steering tube. To this end a control rod 43 is provided that threadedly extends through block 42 and through tubular member 41. At the bottom end of rod 43 are provided a pair of cams 44 that, upon rotation of rod 43 urge outwardly a pair of respective friction elements 45 into engagement with the inner wall of the suspension tube 35. Increasingly firm engagement of the suspension tube by the friction elements reduces the ability of the suspension tube to move and thus reduces the damping experienced by the rider. When the friction elements fully engage the suspension tube so that it cannot move at all the suspension is locked. The degree of control of the amount of damping that this embodiment provides will, of course, depend on the shape of the cam surfaces which can be designed as appropriate.

Figure 7:
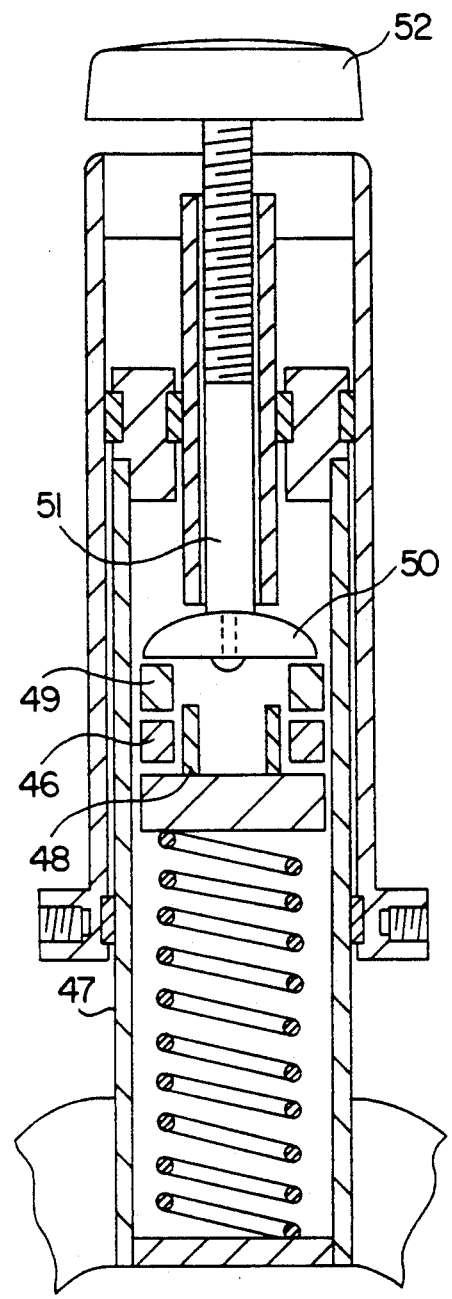
FIG. 7 is a view similar to FIG. 2 of a fourth embodiment.
Figure 6:
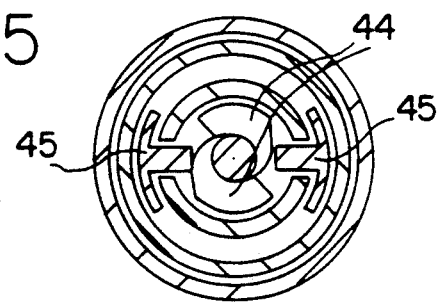
FIG. 6 is a cross-section through line B—B of FIG. 5.

In the embodiment of FIG. 7 restriction of the movement of the suspension tube is achieved by compressing an elastomeric ring 46 that is sandwiched between the inner surface of the suspension tube 47 and the tubular member 48 equivalent to tubular member 41 of FIG. 5. The ring 46 is compressed by metal ring 49 that is pressed downwardly by a plate 50 provided at the bottom of control rod 51. Rotation of the screw-threaded control rod 51 by knob 52 causes the ring to be compressed and expand outwardly in accordance with Poisson's ratio to engage the suspension tube to varying degrees.

It will thus be seen that, as with the hydropneumatic/hydraulic embodiments, control of the degree of damping may be effected in their dry embodiments simply by rotating the knob provided at the top of the head tube. As with the previous embodiments a detent mechanism for the knob may be provided if desired.

Figure 8:
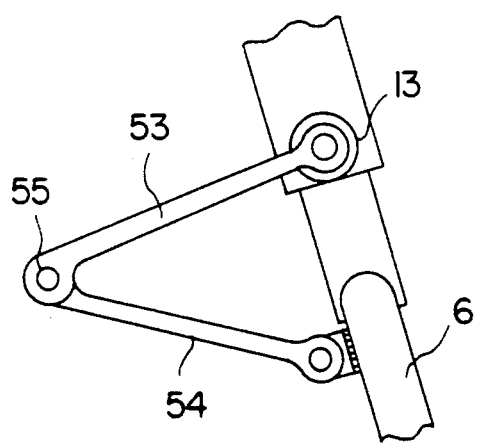
FIG. 8 is an illustration of a steering linkage.

In all the embodiments a steering linkage, FIG. 8, is provided to maintain the steering tube in a fixed directional relationship with the suspension tube and the wheel. Such a linkage can comprise pairs of arms 53, 54 connected to the projecting lugs 13 (FIG. 2) of the steering tube, and to the front fork respectively, these arms being pivoted at a common pivot axis 55.

I claim:

1. A bicycle having a suspension system comprising:
   a frame comprising a head tube and a steering tube located in the head tube;
   front and rear wheels;
   damping means located within said steering tube for damping movement of said front wheel relative to said frame, said damping means including a chamber containing hydraulic fluid and divided into two communicating portions by a piston;
   means for adjusting the damping provided by said damping means, said adjusting means comprising means for varying the rate at which fluid can flow between said portions of said damping means chamber from one side of said damping means piston to the other, said adjusting means being operable by a rider while cycling; and
   resilient load bearing means for co-operating between said frame and said front wheel to permit limited movement of said front wheel relative to said frame against a resiliant restoring force.

2. A bicycle according to claim 1, wherein said flow rate varying means comprises a needle valve.

3. A bicycle according to claim 1, wherein said flow rate varying means comprises a rotary valve.

4. A suspension system for a pedal bicycle, the bicycle having a frame which comprises a head tube and a steering tube located in the head tube, the bicycle also including front and rear wheels and handle-bars, the suspension system comprising:
   damping means located within the steering tube of the bicycle frame for damping movement of the front wheel relative to the bicycle frame, said damping means including a chamber containing hydraulic fluid, said chamber being divided into two communicating portions by a piston;
   means for adjusting the degree of damping provided by said damping means, said adjusting means comprising means for varying the rate at which fluid can flow from one side of said damping means piston to the other;
   control means for said adjusting means, said control means being located at the top of the head tube whereby said adjusting means is adjustable by a rider while cycling; and
   resilient load-bearing means for cooperating between a frame part and the front wheel of the bicycle to permit limited movement of the front wheel relative to the frame against a resilient restoring force, said resilient load-bearing means including means for pressurizing said damping means chamber, said pressurizing means including a pneumatic chamber.

5. A suspension system according to claim 4, wherein said pneumatic chamber is provided beneath said damping means hydraulic chamber.

6. A suspension system according to claim 4, wherein said pneumatic chamber is charged with a pressurized inert gas.

7. A suspension system for a pedal bicycle, the bicycle having a frame and wheels, the frame including a head tube and a steering tube located in the head tube, the suspension system coupling a wheel to the frame, said suspension system comprising:
   damping means located within the steering tube portion of the bicycle frame for damping movement of a wheel of the bicycle relative to the bicycle frame, said damping means including a chamber containing hydraulic fluid and divided into two communicating portions by a piston;
   means for adjusting the damping provided by said damping means, said adjusting means comprising valve means for varying the rate at which fluid can flow from one side of said piston to the other, said valve means including:
      a rotary valve, said rotary valve comprising a rotatable rod having an axial groove in the surface thereof, said rod being in part surrounded by an extension of said piston, said piston extension having a plurality of holes of various sizes therein such that upon rotation of said rod said groove may be brought into alignment with different of said holes to define communicating passages of different cross-section;
   control means for said adjusting means, said control means being positioned at the top of the head tube so as to be operable by a rider while cycling; and
   means for pressurizing said hydraulic chamber, said pressurizing means including a pneumatic chamber.

8. A suspension system according to claim 7 wherein said pneumatic chamber is provided beneath said chamber containing hydraulic fluid.

* * * * *